United States Patent [19]  [11] 3,951,592
Botros  [45] Apr. 20, 1976

[54] POLYESTER FABRIC MATERIALS DYED WITH MONOAZO DYES MADE FROM 4-AMINO-7-NITROBENZOTRIAZOLE

[75] Inventor: Raouf Botros, Beech Creek, Pa.

[73] Assignee: American Color & Chemical Corporation, Charlotte, N.C.

[22] Filed: July 13, 1973

[21] Appl. No.: 378,946

[52] U.S. Cl.................................. 8/41 C; 260/141; 260/308 B; 260/490
[51] Int. Cl.² ................. C09B 29/00; C09B 29/08; D06P 1/04; D06P 3/52
[58] Field of Search....................... 8/41 C; 260/157

[56] References Cited
UNITED STATES PATENTS

| | | | |
|---|---|---|---|
| 3,050,516 | 8/1962 | Merian et al. ..................... | 260/205 |
| 3,329,669 | 7/1967 | Sartori ................................ | 260/158 |
| 3,586,663 | 6/1971 | Kruckenberg ................... | 260/207.1 |
| 3,860,389 | 1/1975 | Renfrew................................. | 8/2 C |

FOREIGN PATENTS OR APPLICATIONS

| | | | |
|---|---|---|---|
| 1,134,175 | 11/1968 | United Kingdom................. | 260/157 |

Primary Examiner—Floyd D. Higel
Attorney, Agent, or Firm—Armstrong, Nikaido & Wegner

[57] ABSTRACT

Azo dyestuffs are provided by the reaction of the diazotized base of 4-amino-7-nitrobenzotriazole with a coupling component, an esterified bis(2-hydroxyalkyl)acylanilide. The result azo dye produces excellent dyeings on polyester fabric materials. The dyeings range in shade from rubine to navy blue and are characterized by fastness to light and good sublimation properties.

6 Claims, No Drawings

POLYESTER FABRIC MATERIALS DYED WITH MONOAZO DYES MADE FROM 4-AMINO-7-NITROBENZOTRIAZOLE

BACKGROUND OF THE INVENTION

Although certain aminobenzotriazoles have been reported for a wide variety of uses in the prior art, the disclosure of such compounds as dyes for polyester fibers has been relatively limited. Various compounds are reported in the literature, such as Sasse et al, U.S. Pat. No. 2,943,017, who reports certain benzotriazoles as being suitable for fungicidal use. Additional benzotriazoles are reported in patents to Hanhart, U.S. Pat. No. 2,671,775; Scalera, U.S. Pat. No. 2,675,376; Margot et al, U.S. Pat. No. 2,806,035; and Mingasson, U.S. Pat. No. 3,417,075. Various azo derivatives of benzotriazoles are reported where the aminonitrobenzotriazole is diazotized, and then reacted with a coupler. French Pat. No. 1,471,064, reports certain benzotriazoles as dyestuffs; however, such dyestuffs are preferably quaternary compounds which are exemplified as acrylonitrile dyestuffs.

In accordance with the invention there are provided a new class of dyestuffs produced from diazotized 4-amino-7-nitro-benzotriazole, which yield excellent dyeings on polyester fabrics.

SUMMARY OF THE INVENTION

In accordance with the invention, there are provided compounds of the formula

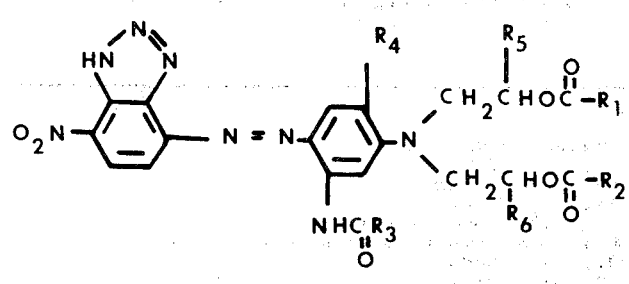

(I)

wherein
each of $R_1$ and $R_2$ is independently lower alkyl, chloro(lower alkyl), bromo(lower alkyl), phenyl, lower alkylphenyl, lower alkoxyphenyl, chlorophenyl or bromophenyl;

$R_3$ is lower alkyl, phenyl or tolyl;

$R_4$ is hydrogen, lower alkyl, lower alkoxy, or chloro; and $R_5$ and $R_6$ are hydrogen or methyl As used herein, the term lower alkyl and lower alkoxy refer to aliphatic groups having up to about four carbon atoms. As lower alkyl groups may be mentioned methyl, ethyl, propyl and butyl; as examples of preferred embodiments may be mentioned the methyl and ethyl groups. As lower alkoxy groups may be mentioned methoxy, ethoxy, propoxy and butoxy; according to a preferred embodiment, there may be mentioned the methoxy and ethoxy groups. According to a preferred embodiment, the group $R_3$ is lower alkyl; the acetamido substituent ($R_3$=methyl) is particularly preferred. At least one of the groups $R_5$ and $R_6$ is preferably hydrogen, and still more preferably both groups are hydrogen, due to the ready availability of the starting materials. In accordance with a preferred aspect of the invention, the esters are formed from aliphatic acids, preferably aliphatic acids wherein $R_1$ and $R_2$ are either lower alkyl or chloro(lower alkyl); compounds wherein both $R_1$ and $R_2$ are methyl have been found to be particularly suitable in accordance with the invention.

The compounds of the invention are useful as dyes for polyester, particularly polyethylene terephthalate, as well as for mixtures of polyester and other fibers, such as polyethylene terephthalate and cotton.

DETAILED DESCRIPTION

The azo dyestuffs (I) made in the conventional manner by adding a diazotized intermediate (II), which is diazotized 4-amino-7-nitrobenzotriazole, to a solution of an appropriate coupling component:

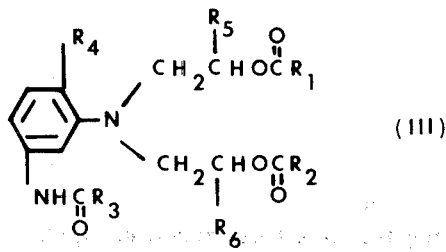

(III)

wherein $R_1$, $R_2$, $R_3$, $R_4$, $R_5$ and $R_6$ are as defined above.

4-Amino-7-nitrobenzotriazole is converted to the diazotized intermediate (II) in the usual way by heating it in a concentrated aqueous solution of a strong mineral acid, such as hydrochloric acid, cooling the resulting solution to a temperature of 0–10°C and adding thereto a quantity of sodium nitrite slightly in excess of the stoichiometric requirement. An alternate method of diazotization involves dissolving sodium nitrite in concentrated sulfuric acid, heating to a temperature of about 60–70°C., cooling the resulting solution to 0–10°C. and adding thereto the 4-amino-7-nitrobenzotriazole.

The coupling component (III) is made from a bis(2-hydroxy-lower alkyl) acyl anilide by esterification with an aliphatic acylating agent; e.g., acetyl chloride, butyryl chloride, propionyl chloride, chloroacetyl chloride, or anhydride thereof, or an aromatic acylating agent; e.g., benzoyl chloride, o-chlorobenzoyl chloride, p-chlorobenzoyl chloride, anisoyl chloride, tolyl chloride, or an acid derivative thereof such as benzoic anhydride. Mixed esterifying agents can be used as described in the United States patent of Dominic A.

Zanella, U.S. Pat. No. 3,520,871 issued July 21, 1970.

The azo dyestuff (I) is made by coupling the diazotized intermediate (II) with the esterified bis(2-hydroxyalkyl)acylanilide by adding the diazonium salt to a cold aqueous acid solution of the coupler. A buffering agent such as sodium acetate to reduce the acidity to a pH of 5 to 7 is added and the mixture is allowed to react for 8 to 24 hours at room temperature and is thereafter filtered and washed acid free. The desired dyestuff is thus obtained in the form of a wet cake.

The azo dyestuff (I) may be used to dye a variety of fibers. Particularly preferred fibers to be dyed with the compounds of the invention are the aromatic polyester fibers, such as polyethylene terephthalate. In addition to dyeing polyester fibers, the compounds of the present invention may also be used to dye mixtures of polyesters and other fibers such as cellulose, such as mixtures of polyethylene terephthalate and cotton, only the polyester portion being dyed.

The azo dyestuffs (I) are applied to aromatic polyester fibers in the form of a dispersed color powder or paste, which is obtained by wet milling, in a conventional apparatus such as a ball mill, the dye, a dispersant such as sodium lignin sulfonate, and a wetting agent. The dispersed cake or paste thus obtained can be dried, if desired at 70-80°C and thereafter micropulverized. Sufficient dispersant is added to give a dispersed powder containing generally between 20-50 percent by weight active dyestuff base.

The dispersed powder, when added to water, with or without auxiliary agents, forms a near colloidal aqueous dispersion from which the aromatic polyester fiber or goods is dyed in the conventional manner to give a fiber containing from 0.01-2 percent dyestuff.

My invention is further illustrated by the following examples:

EXAMPLE I

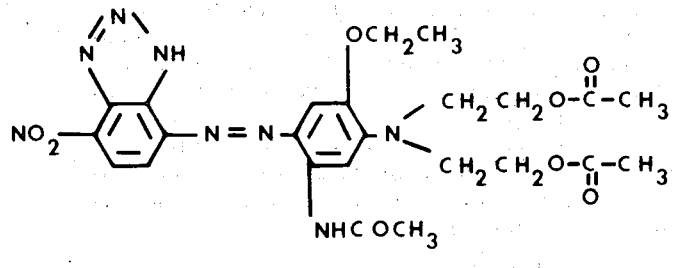

M.W. 556

4-Nitro-7-aminobenzotriazole is diazotized in nitrosylsulfuric acid and coupled into 3-acetamino-6-ethoxy-N,N-diacetoxyethylaniline.

Materials:

- 100 g. 66° Be sulfuric acid
- 7.1 g. sodium nitrite
- 100 g. glacial acetic acid
- 15 g. propionic acid
- 18 g. 4-nitro-7-aminobenzotriazole
- 28.2 g. 3-acetamino-6-ethoxy-N,N-dihydroxyethylaniline
- 21 g. acetic anhydride
- 200 g. sodium acetate
- Yield: 40.1 g.

Procedure:

A. Coupler:

Charge into a 250 ml. 3-neck flask equipped with agitator, condenser and thermometer
- 28.2 g. 3-acetamino-6-ethoxy-N,N-dihydroxyethylaniline
- 25 g. glacial acetic acid.

The mixture is heated to 95°C, and there is added dropwise at 95–100°C
- 21 g. acetic anhydride.

After the addition is complete, the temperature is held at 95–100°C for 1 hour. The reaction mixture is stirred and cooled to 60°C.

B. Diazonium Salt

Charge into a 250 ml. 3-neck flask equipped with stirrer, thermometer and anhydrous calcium sulfate tube
- 100 g. 66° Be sulfuric acid.

It is cooled to 10°C. There is added in small portions at 10–15°C
- 7.1 g. sodium nitrite.

The temperature is raised gradually to 65°C until all the sodium nitrite dissolves. The reaction mixture is cooled to 0° C, and there is added dropwise at 0–5°C (ice-salt bath) a solution of
- 75 g. glacial acetic acid
- 15 g. propionic acid.

Then there is added in small portions
- 18 g. 4-nitro-7-aminobenzotriazole (0.1 mole).

The reaction mixture is stirred at 0–5°C for 3 hours, then it is drowned in an ice-water mixture. Excess nitrous acid is removed by adding sulfamic acid. The diazo solution is clarified and kept at 0°C.

C. Coupling:

The coupler is added slowly to the diazo solution while temperature is maintained at 0°C. Then there is added in 4 portions a total of 200 g. sodium acetate.

The coupling is complete after 20 minutes. The reaction mixture is filtered, and the product is washed neutral and clear with hot water. The cake is sucked dry.
Yield: 205.8 g. (wet cake)=40.1 g. dry content
Th. Yield: 55.6 g. = 72%.

Standardization:

A 10% color content paste was made.
Charged to a sand mill
- 159.4 g. wet cake = 31 g. 100% color
- 46.6 g. Marasperse N-22
- 104.0 ml. water The mixture is sandmilled until dispersion test is satisfactory.

EXAMPLE II

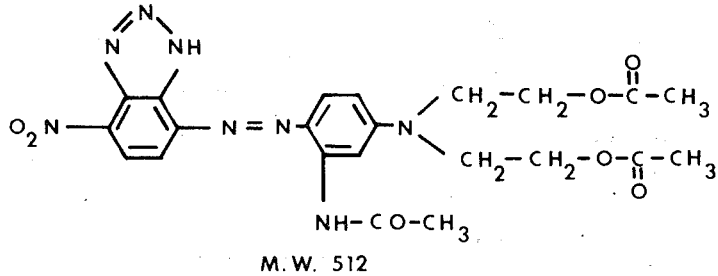

M.W. 512

4-Nitro-7-aminobenzotriazole is diazotized in nitrosylsulfuric acid and coupled into 3-acetamino-N,N-diacetoxyethylaniline.

The coupling is complete in 20 minutes. The reaction mixture is filtered, and the product is washed neutral and clear with hot water. The cake is sucked dry. Yield:

Materials:

- 100 g. 66°Be sulfuric acid
- 7.1 g. sodium nitrite
- 75 g. glacial acetic acid
- 15 g. propionic acid
- 18 g. 4-nitro-7-aminobenzotriazole
- 100 g. 40% acetic acid solution of 3-acetamido-N,N-diacetoxyethylaniline
- 200 g. sodium acetate.
- Yield: 38 g.

Procedure:

A. Diazotization:

Charge into a 250 ml. 3-neck flask equipped with stirrer, thermometer and anhydrous calcium sulfate tube
- 100 g. 66° Be sulfuric acid.
It is cooled to 10°C. There is added in small portions at 10–15°C
- 7.1 g. sodium nitrite.
Temperature is raised gradually to 65°C until all the sodium nitrite is dissolved. The reaction mixture is cooled to 0°C, and there is added dropwise at 0–5°C (ice-salt bath) a colution of
- 75 g. glacial acetic acid
- 15 g. propionic acid.
Then there is added in small portions
- 18 g. 4-nitro-7-aminobenzotriazole (0.1 mole).
The reaction mixture is stirred at 0–5°C for 3 hours, then it is drowned in ice-water mixture. Excess nitrous acid is removed by adding sulfamic acid. The diazo solution is clarified and kept at 0°C.

B. Coupling:

- 100 g. 40% acetic acid solution of 3-acetamino-N,N-diacetoxyethylaniline
is added slowly to the diazo solution while the temperature is maintained near 0°C. Then there is added in 4 portions a total of
- 200 g. sodium acetate.

181 g. (wet cake) = 38 g. dry content Th. Yield: 51.2 g. = 74.2%.

Standardization:
A 10% color content paste is made.
Charge to a sandmill
153.0 g. wet cake = 32.13 g. 100% COLOR
48.3 g. Lignosol D-10
120.0 ml. water.

The mixture is sandmilled until dispersion test is satisfactory.

EXAMPLE III

An aqueous solution of one percent by weight of monosodium phosphate and twenty percent by weight based on the weight of fabric dyed, of a commercially available phenolic carrier is prepared. The resulting solution is heated to 120°F and 10 g. of Dacron polyester fabric is added thereto. The temperature is maintained for 10 minutes and two percent by weight of the dyestuff paste prepared as described above in Example I is added to the bath. The resulting dye bath is heated at 208°F and maintained at this temperature for 90 minutes. The dyed fabric is removed and after-soaped by working it in a one percent soap solution at 180°F for 10 minutes. It is then rinsed and dried. The dyed fabric is navy blue in color. The dyeing is characterized by being fast to light and having good sublimation properties. Similar dyeings of a violet shade are prepared by using the dyestuff in Example II.

EXAMPLE IV–X

Substitution of the appropriate reactants in the process of Example I yields the dyestuffs indicated below. The dyestuffs are suitable for dyeing poly(ethylene terephthalate) in the shade indicated below, the dyeings having comparable properties when dyed according to the procedure indicated below. The dyestuff set forth below may be used to dye polyester fibers either in a dispersion with a carrier at 50°–100°C or without a carrier at 100°–150°C under pressure. The dyestuff may also be applied to the polyester by printing or padding, which processes are carried out in the presence of suitable thickening agents followed by fixation at high temperature, optionally in the presence of steam.

| EXAMPLE: | $R_1$ | $R_2$ | $R_3$ | $R_4$ | $R_5$ | $R_6$ | HUE |
|---|---|---|---|---|---|---|---|
| IV. | phenyl | $CH_3$ | $CH_3$ | $OC_2H_5$ | H | H | navy blue |
| V. | phenyl | phenyl | $CH_3$ | $OC_2H_5$ | H | H | navy blue |
| VI. | $CH_3$ | $CH_3$ | phenyl | $OCH_3$ | H | H | navy blue |
| VII. | $CH_2Cl$ | $CH_2CH_2CH_3$ | $C_2H_5$ | $CH_3$ | H | H | violet |
| VIII. | $CH_3$ | $CH_3$ | $CH_3$ | H | $CH_3$ | $CH_3$ | bluish-red |
| IX. | $CH_3$ | $CH_3$ | phenyl | H | H | H | rubine |
| X. | $CH_3$ | 4-Cl-phenyl | $CH_3$ | H | H | H | rubine |

What is claimed is:
1. A polyester textile fiber dyed with from 0.01 to 2% by weight, based on the weight of the fiber, of a compound of the formula

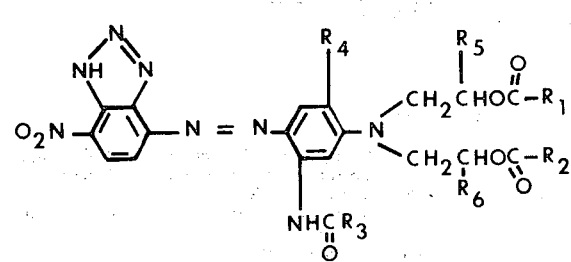

wherein
each of $R_1$ and $R_2$ is independently lower alkyl, chloro(lower alkyl), bromo(lower alkyl), phenyl, lower alkylphenyl, lower alkoxyphenyl, chlorophenyl or bromophenyl;
$R_3$ is lower alkyl, phenyl or tolyl;
$R_4$ is hydrogen, lower alkyl, lower alkoxy, or chloro;
and $R_5$ and $R_6$ are hydrogen or methyl.
2. The polyester textile fiber of claim 1, wherein $R_5$ and $R_6$ of the formula are hydrogen.
3. The polyester textile fiber of claim 1 wherein $R_3$ of the formula is lower alkyl.
4. The polyester textile fiber of claim 1 wherein each of $R_1$ and $R_2$ of the formula is independently selected from the group consisting of lower alkyl, chloro(lower alkyl) and bromo(lower alkyl).
5. The polyester textile fiber of claim 1, wherein said polyester is polyethylene terephthalate.
6. The polyester textile fiber of claim 5, wherein said compound is of the formula
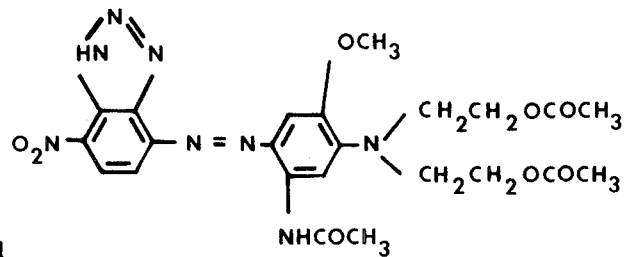
* * * * *